United States Patent
Branov et al.

(10) Patent No.: US 6,805,650 B2
(45) Date of Patent: Oct. 19, 2004

(54) PLANOCENTRIC DISC RECLINER

(75) Inventors: Chris Branov, Toronto (CA); Pius Ng, Markham (CA)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 10/381,768

(22) PCT Filed: Oct. 1, 2001

(86) PCT No.: PCT/CA01/01381

§ 371 (c)(1), (2), (4) Date: Mar. 28, 2003

(87) PCT Pub. No.: WO02/26522

PCT Pub. Date: Apr. 4, 2002

(65) Prior Publication Data

US 2004/0014545 A1 Jan. 22, 2004

(51) Int. Cl.$^7$ .................................................. F16H 1/32
(52) U.S. Cl. ...................... 475/162; 475/178; 297/362
(58) Field of Search .............................. 475/162, 178; 297/362

(56) References Cited

U.S. PATENT DOCUMENTS

| | | | |
|---|---|---|---|
| 4,020,717 A | * | 5/1977 | Johnson .................. 297/362 X |
| 4,366,983 A | | 1/1983 | Klueting et al. |
| 4,453,767 A | * | 6/1984 | Walk et al. ................. 297/362 |
| 4,457,556 A | * | 7/1984 | Klingelhofer ............... 297/362 |
| 4,469,375 A | | 9/1984 | Boyer |
| 4,884,844 A | | 12/1989 | Kershaw et al. |
| 4,887,863 A | | 12/1989 | Caillol |
| 5,096,261 A | | 3/1992 | Baloche |
| 5,098,359 A | | 3/1992 | Chales et al. |
| 5,209,637 A | * | 5/1993 | Reubeuze ............... 297/362 X |
| 5,277,672 A | | 1/1994 | Droulon et al. |
| 5,524,970 A | | 6/1996 | Kienke et al. |
| 5,536,217 A | | 7/1996 | Droulon et al. |
| 5,725,452 A | | 3/1998 | Droulon et al. |
| 5,755,491 A | | 5/1998 | Baloche et al. |
| 5,857,746 A | | 1/1999 | Barrere et al. |
| 5,871,414 A | | 2/1999 | Voss et al. |
| 5,951,427 A | | 9/1999 | Schroeder |
| 6,076,889 A | | 6/2000 | Su et al. |
| 6,085,386 A | | 7/2000 | Blanchard et al. |
| 6,112,370 A | | 9/2000 | Blanchard et al. |
| 6,120,098 A | | 9/2000 | Magyar et al. |
| 6,168,235 B1 | | 1/2001 | Freund |

FOREIGN PATENT DOCUMENTS

| | | | | |
|---|---|---|---|---|
| EP | 0406089 | * | 1/1991 | .................. 297/362 |
| JP | 05-15426 | * | 1/1993 | .................. 297/362 |

* cited by examiner

*Primary Examiner*—Ha Ho
(74) *Attorney, Agent, or Firm*—Clark Hill PLC

(57) ABSTRACT

A continuously engaged recliner assembly (20) selectively locks a seat back in one of a plurality of reclined positions about a pivot axis relative to a seat cushion on a vehicle seat. The recliner assembly includes a cylindrical housing (30) having an annular rim of gear teeth (34). A carrier plate (40), having outwardly extending drive pins (42), is rotatably nested within the cylindrical housing (30). An input shaft (50) is rotatably journaled to and extends between the cylindrical housing (30) and the carrier plate (40). Rotation of the shaft (30) causes the first and second gear (60, 62) to move in a hypocycloidal motion around the annular rim of gear teeth (34). A biasing member (58) operatively interconnecting the first (52) and second (55) cams rotatably biases the first and second cams in opposing directions, in turn biasing the first (60) and second (62) gears, respectively, in opposing directions against the cylindrical housing (30), thereby minimizing play within the recliner mechanism.

8 Claims, 4 Drawing Sheets

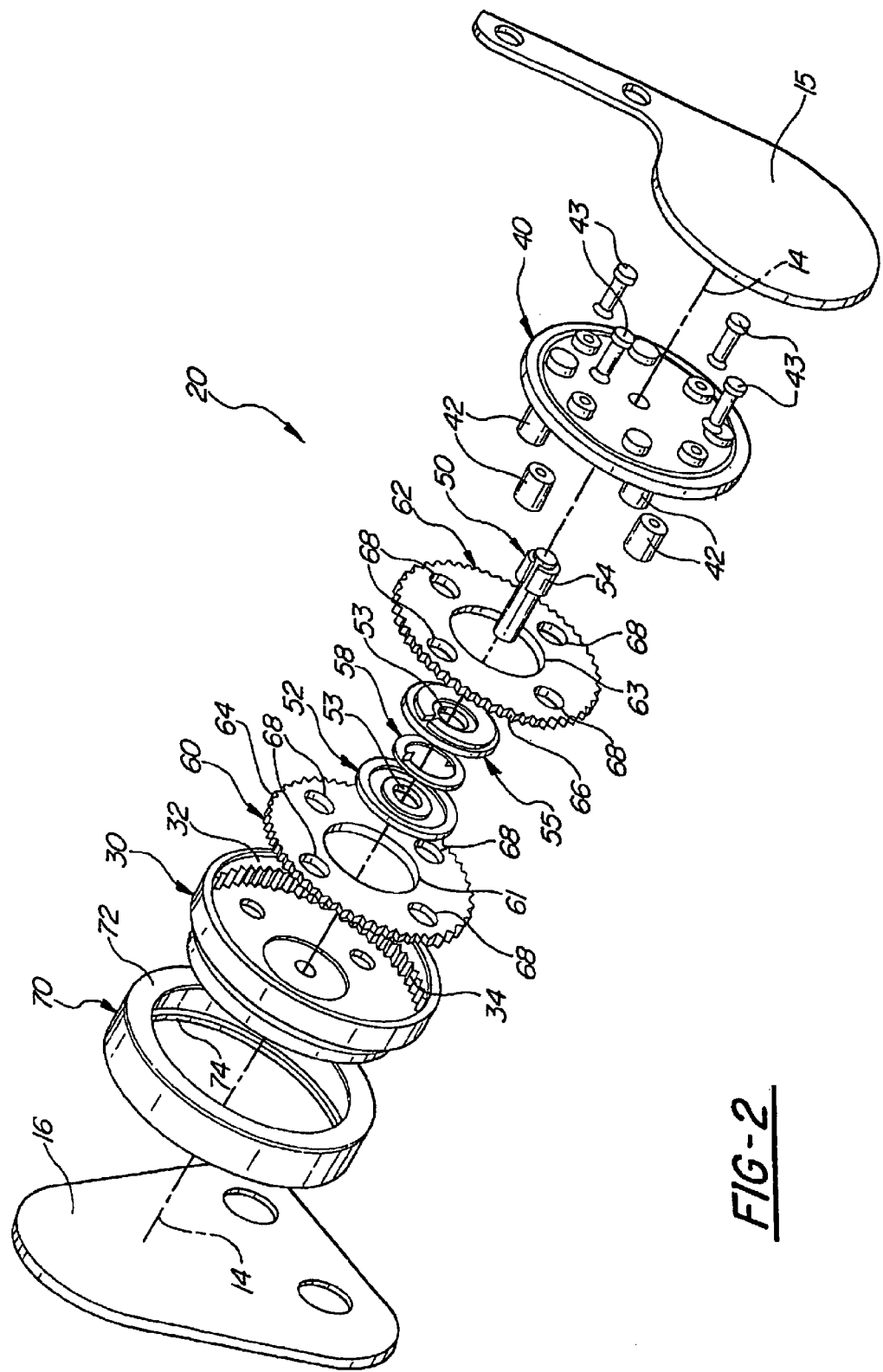

PLANOCENTRIC DISC RECLINER

FIELD OF THE INVENTION

The subject invention relates to a recliner assembly for pivotally adjusting a seat back relative to a seat cushion of an automotive vehicle seat.

DESCRIPTION OF THE PRIOR ART

Automotive vehicles include seat assemblies for supporting a seated occupant in the vehicle. The seat assemblies typically comprise a seat cushion and a seat back pivotally connected to the seat cushion by a recliner mechanism allowing adjustment of the seat back relative to the seat cushion between a plurality of reclined positions. Each of the seat cushion and seat back commonly comprise a rigid frame structure supporting a cellular foam pad that is encased by a fabric trim cover.

Continuously engaged disc recliners are well known in the vehicle seating art and are commonly used to pivotally connect the seat back to the seat cushion. Continuously engaged disc recliners commonly include a cylindrical inner disc fixedly secured to the seat cushion and a cylindrical outer disc fixedly secured to the seat back and rotatably coupled to the inner disc. Continuously engaged disc recliners further include a locking mechanism for maintaining the angular position of the seat back relative to the seat cushion. The locking mechanism typically includes an annular rim on the outer disc having a plurality of first gear teeth and an annular rim on the inner disc having a plurality of second gear teeth. The inner disc has at least one less gear tooth than the outer disc. The first gear teeth of the outer disc are held in continuous meshing engagement with the second gear teeth of the inner disc by an eccentric input shaft rotatably journaled to the outer and inner discs. The angular position of the seat back is adjusted by rotating the input shaft. Rotation of the input shaft drives the outer disc and the seat back in a hypocycloidal motion as the outer disc moves around the annular rim of the inner disc. An example of such a continuously engaged disc recliner is disclosed in U.S. Pat. No. 5,536,217.

It is common for continuously engaged recliners, as described above, to have play due to dimensional variation, clearances by design, or long term wear which result in a chucking motion of the seat back.

SUMMARY OF THE INVENTION

This invention relates to a continuously engaged recliner assembly for releaseably locking a seat back in one of a plurality of reclined positions relative to a seat cushion of a vehicle seat. The recliner assembly comprises a fixed flange having an annular rim of gear teeth and a mobile flange spaced apart from the fixed flange. An input shaft extends between and is journaled to both the fixed and mobile flanges to define a longitudinal pivot axis. At least two cam members are mounted to the input shaft. At least two pinion gears are operatively coupled to respective cam members and adapted for engagement with the annular rim of gear teeth on the fixed flange. Each of the pinion gears are driven by one of the cam members in hypocycloidal motion about the fixed flange during rotation of the input shaft relative to the fixed flange. Each of the pinion gears are operatively coupled to said mobile flange for transferring motion of the pinion gears to the mobile flange. A biasing member extends between the cam members for rotatably biasing apart the cam members about the pivot axis.

The engagement of the annular rim of gear teeth on the fixed flange with each of the pinion gears defines a first clearance between the annular rim of gear teeth on the fixed flange and each of the pinion gears. Each of the cam members includes a keyed bore for receiving the input shaft in splined relation therethrough. A second clearance is defined between the input shaft and each of the cam members such that the biasing member, acting upon the cam members, minimizes both of the first and second clearances.

The mobile flange includes an aperture and each of the pinion gears includes an aperture corresponding to the aperture of the mobile flange. A pin extends through the apertures of each of the pinion gears and the mobile flange for transferring motion of the pinion gears to the mobile flange.

The apertures of both of the pinion gears are oversized relative to the pin, so that the mobile flange is rotatably driven about the pivot axis in response to hypocycloidal motion of the pinion gears about the fixed flange.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a perspective exploded view of a recliner assembly according to one embodiment of the invention;

DETAILED DESCRIPTION OF THE PREFERRED EMBODIMENTS

Figure 1:
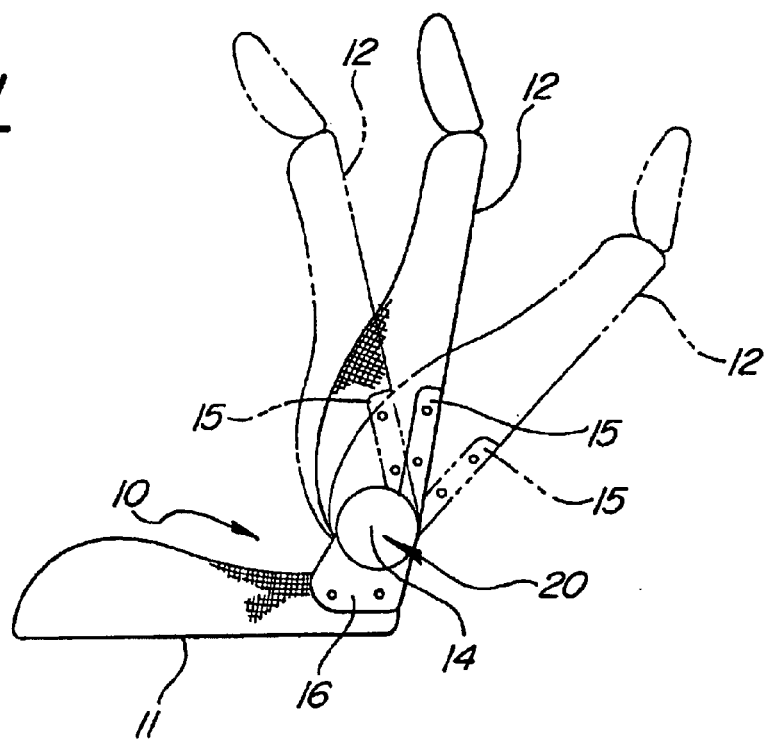
FIG. 1 is a schematic side view of an automotive seat assembly incorporating the invention.

Referring to the Figures, FIG. 1 discloses a seat assembly 10 for use in an automotive vehicle. The seat assembly 10 includes a seat cushion 11 and a seat back 12. Each of the seat cushion 11 and seat back 12 typically comprises a rigid frame structure for supporting a contoured foam pad encased by a trim cover. The seat assembly 10 further includes a continuously engaged recliner assembly 20 operatively interconnecting the seat cushion 11 and the seat back 12 for pivotal movement of the seat back 12 about a pivot axis 14 between a plurality of reclined seating positions.

Referring to FIG. 2, the recliner assembly 20 comprises a fixed flange or cylindrical housing 30 having an inner annular surface 32. A plurality of gear teeth 34 extend radially inwardly from a portion of the annular surface 32. A circular mobile flange or carrier plate 40 is rotatably nested within the annular surface 32 of the cylindrical housing 30 adjacent to the gear teeth 34. Drive pins 42 are fixedly mounted to the carrier plate 40 by rivets 43 or other suitable means, such as welding, and extend outwardly from the carrier plate 40 towards the cylindrical housing 30.

Figure 3:
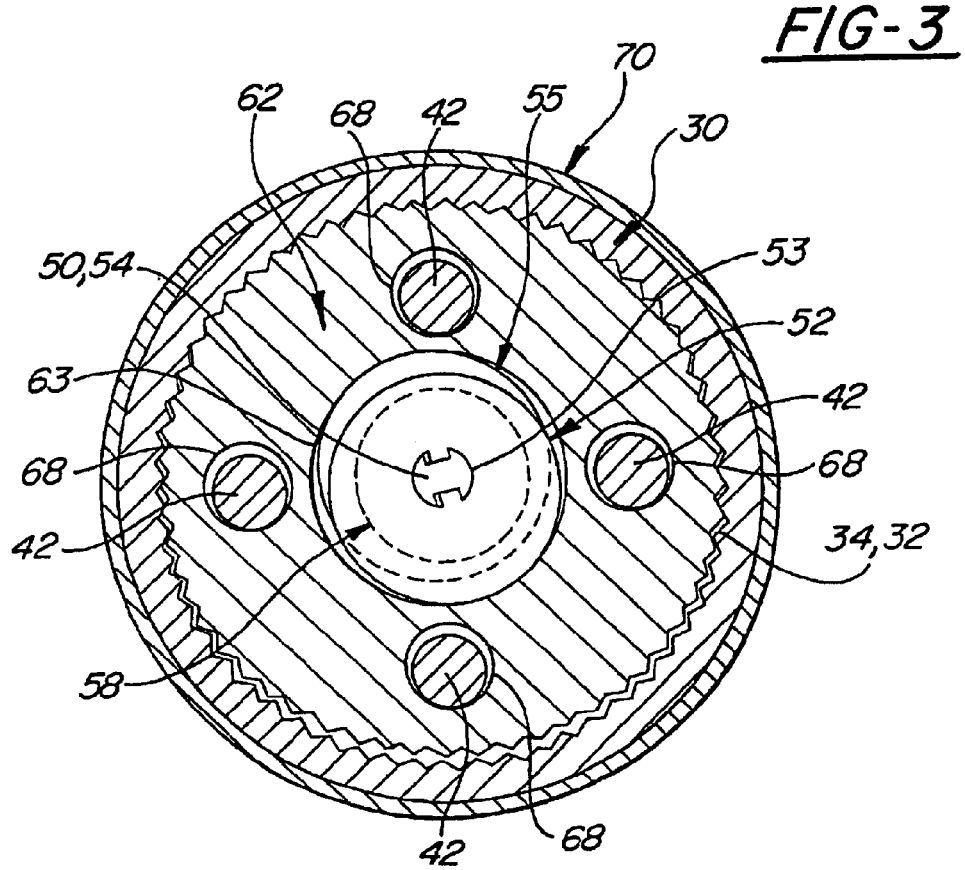
FIG. 3 is a cross-sectional view of one embodiment of the invention.

An input shaft 50 extends between and is rotatably journaled to both the cylindrical housing 30 and the carrier plate 40, defining the pivot axis 14. Eccentric first and second cams 52, 55, disposed between the housing 30 and the carrier plate 40, are assembled in a splined relationship to the input shaft 50. Specifically, as shown in FIG. 3, each of the cams 52, 55 include keyed apertures 53 for receiving a complementary portion 54 of the input shaft 50 therethrough defining a first clearance X therebetween. The first and second cams 52, 55 are assembled to the input shaft 50 out of phase relative to the cylindrical housing 30, preferably diametrically opposed, from one another. Out of phase means that the first and second gears 60, 62 are never engaged with the same portion of the gear teeth 34 of the cylindrical housing 30. The first and second gears 60, 62 are operatively assembled to the first and second cams 52, 55, respectively. More specifically, each of the first and second gears 60, 62 have center bores 61, 63 for slidably engaging the first and second cams 52, 55, respectively. Each of the first and second gears 60, 62 have an outer periphery of radially extending gear teeth 64, 66 meshingly engaged with the gear teeth 34 of the cylindrical housing 30 defining a second clearance Y therebetween. Each of the first and second gears 60, 62 has at least one less gear tooth than the cylindrical housing 30. Both of the first and second gears 60, 62 have bores 68, each for receiving one of the drive pins 42 therethrough. The diameter of the bores 68 are oversized in relation to the diameter of the drive pins 42. A biasing member 58, preferably a flattened helical spring, is disposed between the first and second cams 52, 55 for rotatably biasing the first and second cams 52, 55 in opposite directions.

A ring-shaped outer cover 70 encases the perimeter of the housing 30. Crimped flanges 72, 74 retain the carrier plate 40 and the housing 30 against one another. Once assembled, the housing 30 is fixedly attached to the seat cushion 11 and the carrier plate 40 is fixedly attached to the seat back 12 by any suitable means, such as welded or bolted mounting brackets 15, 16.

In operation, the angular position of the seat back 12 relative to the seat cushion 11 is adjusted by rotating the input shaft 50 by any conventional means, such as with an electric motor or manually with a knob or handle. The first and second cams 52, 55, coupled to the rotating input shaft 50, drive the first and second gears 60, 62, respectively, in a wobbling rotary or hypocycloidal motion within the housing 30. Specifically, rotation of the input shaft 50 forces sequential engagement and disengagement of the gear teeth 64, 66 of the first and second gears 60, 62 with successive gear teeth 34 of the cylindrical housing 30. In turn, the first and second gears 60, 62 engage the drive pins 42 of the carrier plate 40 to transfer motion of the first and second gears 60, 62 to the carrier plate 40. The radial component of the hypocycloidal motion of the first and second gears 60, 62 is lost due to the oversizing of the bores 68 relative to the drive pins 42. Only the rotational component of the hypocycloidal motion of the first and second gears 60, 62 is transferred through the drive pins 42 to the carrier plate 40 and the seat back 12. Play between the first and second gears 60, 62 and the cylindrical housing 30 are minimized by the biasing member 58. Specifically, the biasing member 58 rotatably forces the first and second cams 52, 55 in opposite directions against the input shaft 50. In turn, the first and second gears 60, 62 are rotatably forced apart by the first and second cams 52, 55, respectively, against the housing 30.

Figure 4:
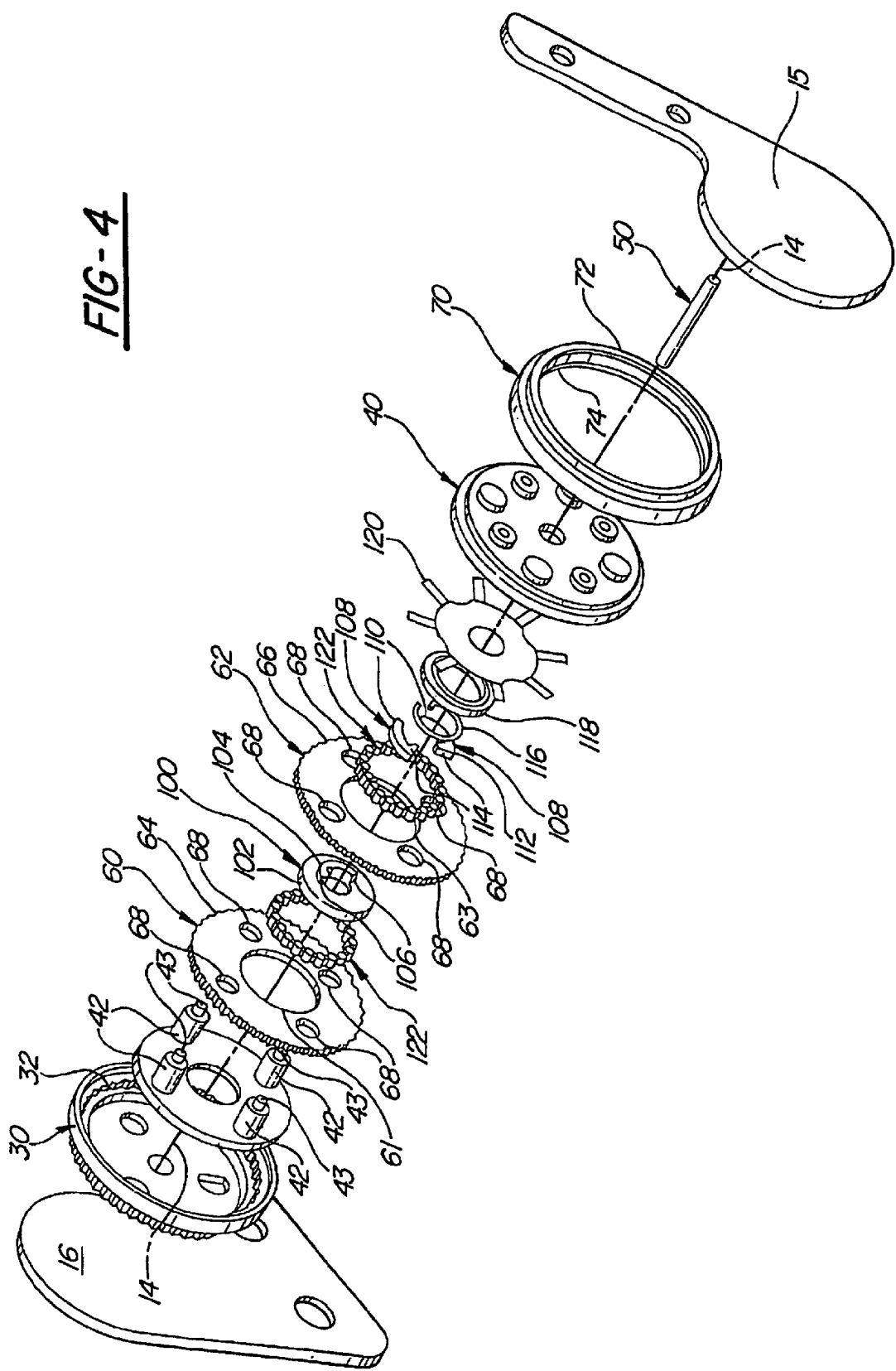
FIG. 4 is a perspective exploded view of an alternative embodiment of the recliner assembly.

FIG. 4 discloses an alternate embodiment of the recliner assembly 20 comprising a cam body 100 disposed between the housing 30 and the carrier plate 40 and assembled in splined relationship to the input shaft 50. The cam body 100 comprises an eccentric portion 102 for driving the first gear 60. A semi-circular portion 104 extends axially from the cam body 100 between the eccentric portion 102 and the carrier plate 40 and terminates peripherally at abutment edges 106. A symmetrically opposite pair of cam wedges 108, each having a wide first portion 110 and a narrow second portion 112, are slidably mounted to the semi-circular portion 104 for driving the second gear 62. The second portions 112 of each of the cam wedges 108 include a tab 114 for engaging the abutment edges 106, thereby limiting rotation of the cam wedges 108 relative to the cam body 100. A biasing member 116, disposed between the first portions 110 of each of the cam wedges 108, biases the cam wedges 108 apart such that the stop tabs 114 are spaced apart from their respective abutment edges 106. A flanged ring 118, positioned between the cam wedges 108 and the second gear 62, retains the cam wedges 108 radially against the cam body 100. A spring washer 120, axially mounted to the input shaft 50, biases the flanged ring 118 away from the carrier plate 40 and towards the cam wedges 108. Preferably, a bearing means 122 of any suitable type, such as ball bearings or bushings, are assembled to the center bores 61, 63 to minimize friction between the first gear 60 and the eccentric portion 102 and between the second gear 62 and the flanged ring 118.

In operation, the cam wedges 108 are wedged between the cam body 100 and the flanged ring 118 to prevent the recliner from being back-driven by external force applied to the seat back 12. Further, the biasing member 116 biases the cam wedges 108 apart to form a combined eccentric profile which forces the first and second gears 60, 62 out of phase, preferably in opposite directions, against the housing 30, thereby minimizing play in the recliner mechanism 20.

Figure 5:
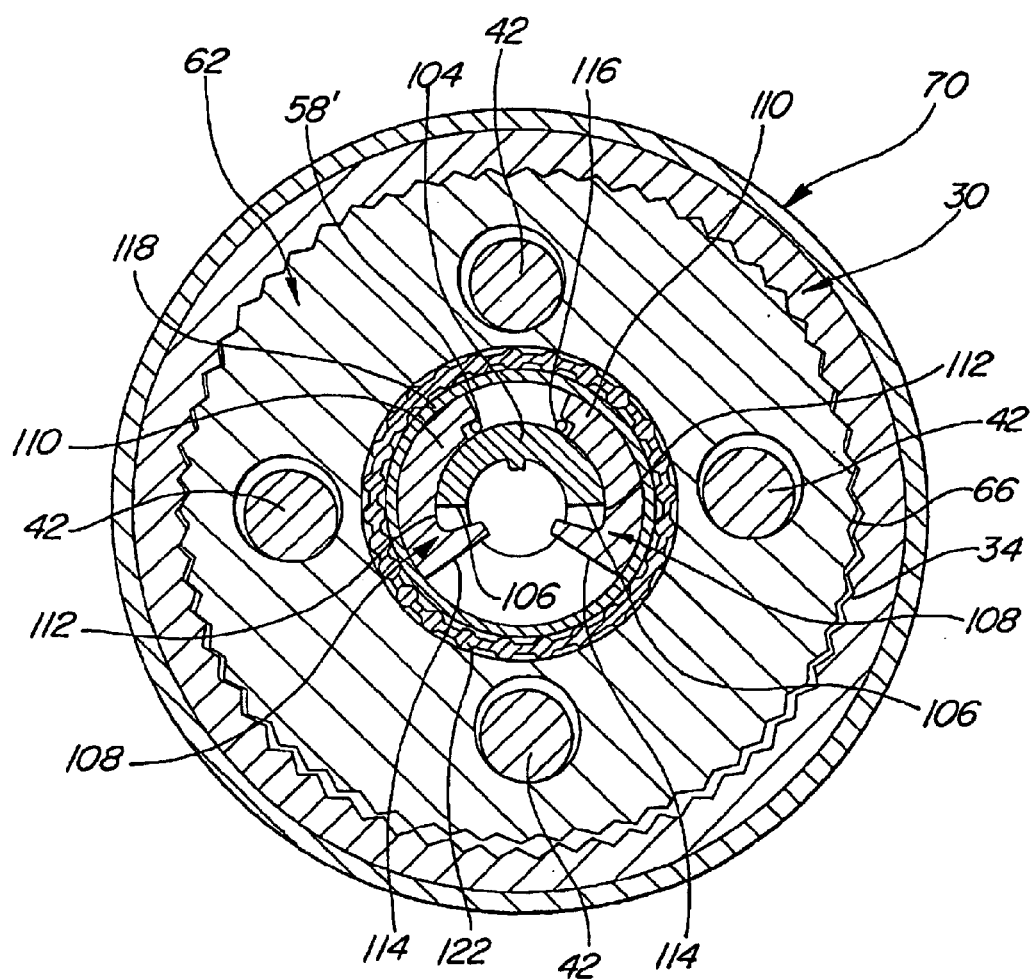
FIG. 5 is a cross-sectional view of the alternative embodiment of the FIG. 3.

The angular position of the seat back 12 relative to the seat cushion 11 is adjusted by rotating the input shaft 50. As best viewed from FIG. 5, the input shaft 50 may be rotated either clockwise or counterclockwise. Rotation of the input shaft 50 in a clockwise direction, for example, causes the right abutment edge 106 to engage the stop tab 114 of the right cam wedge 108. The right cam wedge 108 moves counterclockwise about the pivot axis 14 with the input shaft 50, thereby freeing the right cam wedge 108 from being wedged between the cam body 100 and the flanged ring 118. The combined eccentric profile formed by the cam wedges 108 is reduced but is sufficient to drive the second gear 62 in a hypocycloidal motion within the housing 30, while at the same time the eccentric portion 102 drives the first gear 60 in a hypocycloidal motion within the housing 30 out of phase relative to the second gear 62. As described above in the preferred embodiment, hypocycloidal motion of the first and second gears 60, 62 is translated to rotational motion of the carrier plate 40 and the seat back 12 about the pivot axis 14.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A recliner assembly for releaseably locking a seat back in one of a plurality of reclined positions relative to a seat cushion of a vehicle seat, said recliner assembly comprising:
 a fixed flange having an annular rim of gear teeth;
 a mobile flange spaced apart from said fixed flange;
 an input shaft extending between and journaled to each of said fixed and mobile flanges, said input shaft defining a longitudinal pivot axis;
 at least two cam members mounted to said input shaft;

at least two pinion gears operatively assembled to said respective cam members and adapted for engagement with said annular rim of gear teeth on said fixed flange, each of said pinion gears driven by one of said cam members in hypocycloidal motion about said fixed flange during rotation of said input shaft relative to said fixed flange, each of said pinion gears operatively coupled to said mobile flange for transferring motion of said pinion gears to said mobile flange; and a biasing member extending between said cam members for rotatably biasing apart said cam members about said pivot axis.

2. A recliner assembly as set forth in claim 1 wherein the engagement of said annular rim of gear teeth on said fixed flange with each of said pinion gears defines a first clearance between said annular rim of gear teeth on said fixed flange and each of said pinion gears.

3. A recliner assembly as set forth in claim 2 wherein each of said cam members includes a keyed bore for receiving said input shaft in splined relation therethrough, whereby a second clearance is defined between said input shaft and each of said cam members such that said biasing member, acting upon said cam members, minimizes both of the first and second clearances.

4. A recliner assembly as set forth in claim 3 wherein said mobile flange includes an aperture and each of said pinion gears includes an aperture corresponding to said aperture of said mobile flange.

5. A recliner assembly as set forth in claim 4 including a pin extending through said apertures of each of said pinion gears and said mobile flange for transferring motion of said pinion gears to said mobile flange.

6. A recliner assembly as set forth in claim 5 wherein said apertures of both of said pinion gears are oversized relative to said pin, so that said mobile flange is rotatably driven about said pivot axis in response to hypocycloidal motion of said pinion gears about said fixed flange.

7. A recliner assembly as set forth in claim 6 wherein said cam members are mounted out of phase to said input shaft for driving said pinion gears out of phase about said fixed flange during rotation of said input shaft.

8. A recliner assembly as set forth in claim 7 wherein said fixed flange is fixedly secured to the seat cushion and said mobile flange is fixedly secured to the seat back.

* * * * *